United States Patent [19]

Martin

[11] Patent Number: 4,962,836
[45] Date of Patent: Oct. 16, 1990

[54] FLUID FRICTION CLUTCH

[75] Inventor: Hans Martin, Stuttgart, Fed. Rep. of Germany

[73] Assignee: Süddeutsche Kühlerfabrik Julius Fr. Behr GmbH & Co. KG, Fed. Rep. of Germany

[21] Appl. No.: 352,409

[22] Filed: May 16, 1989

[30] Foreign Application Priority Data

May 20, 1988 [DE] Fed. Rep. of Germany ....... 3817226

[51] Int. Cl.$^5$ ........................ F16D 35/00; F16D 43/25
[52] U.S. Cl. ................................. 192/58 B; 192/82 T
[58] Field of Search ........................... 192/58 B, 82 T

[56] References Cited

U.S. PATENT DOCUMENTS

| 3,191,733 | 6/1965 | Weir | 192/58 B |
| 3,217,849 | 11/1965 | Weir | 192/82 T X |
| 3,262,528 | 7/1966 | Weir | 192/58 B |
| 4,386,585 | 6/1983 | Kittel et al. | 192/82 T X |
| 4,505,367 | 3/1985 | Martin | 192/58 B |
| 4,629,046 | 12/1986 | Martin | 192/58 B |
| 4,662,495 | 5/1987 | Brunken | 192/58 B |
| 4,665,694 | 5/1987 | Brunken | 192/58 B X |

FOREIGN PATENT DOCUMENTS

| 3148872 | 6/1983 | Fed. Rep. of Germany .... 192/58 B |
| 3149104 | 6/1983 | Fed. Rep. of Germany . |
| 3149105 | 6/1983 | Fed. Rep. of Germany . |
| 3520140 | 10/1986 | Fed. Rep. of Germany . |

Primary Examiner—Rodney H. Bonck
Attorney, Agent, or Firm—Evenson, Wands, Edwards, Lenahan & McKeown

[57] ABSTRACT

A fluid friction clutch is disclosed for vehicle cooling fans and the like, which clutch is controlled by a bimetallic element controlling a clutch fluid valve opening. Since the bimetallic element must have degrees of freedom, the fastening of the bimetallic elements at the cover of fluid friction clutch results in difficulties, particularly if the clutch is subjected to high stress. In order to avoid that the bimetallic element can move away from its position in the case of high stress, it is suggested to provide a bimetallic element which is clamped in only at one side and the free end of which has the required freedom of motion, but which can be fastened securely in its position. The new clutch is used for cooling fans of motor vehicle engines which are to be switched as a function of the temperature.

8 Claims, 2 Drawing Sheets

FLUID FRICTION CLUTCH

BACKGROUND AND SUMMARY OF THE INVENTION

The invention relates to a fluid friction clutch for controlling vehicle cooling fan motor drives and the like.

In known fluid friction clutches such as described in commonly assigned U.S. Pat. No. 4,505,367, a bimetallic control element is clamped radially over the cover and, with both its ends, which have corresponding recesses, is clamped under projections of ribs at the cover which are directed toward the inside and are used for the elimination of heat. The bimetallic element which thus is flexibly clamped on both sides, at the front side of the cover, is located in the coupling center or, in constructions having a central screw bolt (DE-PS No. 31 49 105 - D 6325), off-center, rests against an actuating pin which tightly penetrates the cover and, on the inside, presses on a pivoted lever which serves as a valve. Depending on the position of the valve it more or less exposes an opening provided in the partition between the working chamber and the storage chamber. In these cases the arrangement is such that, at higher temperatures, at which the connecting of the clutch is desired which as a rule is assigned to the cooling fan of a motor vehicle radiator, the bimetallic element bends toward the outside away from the cover, so that, as a result, the pin releases the valve lever and this valve lever exposes the valve opening. The clutch fluid will then move from the storage space into the working space, and the clutch housing at which the fan blades are mounted, for example, on the outside, the fan blades are mounted, is taken along by the driven clutch disk by means of the fluid friction.

In order to avoid, in the case of such a flexible mounting, that the adjusted positions of the bimetallic element changes during the operation and that, as result, the connecting or engaging point of the clutch also changes, the two ends of the bimetallic element are secured in their position by means of a silicone stopper applied at the fastening point. However, this type of fastening is not sufficient in all cases in order to ensure a secure hold of the bimetallic element. This is particularly true when the clutch is mounted directly at the crankshaft. The then occurring shaking and stress may result in damage to the fastening points and thus in a change of position of the bimetallic element which is also connected with an undesirable change of the connecting temperature.

An object of the invention is therefore to develop a fluid friction clutch of the initially mentioned type such that the bimetallic element will be fastened securely also in the case of high stress, but will nevertheless have the required freedom of motion at the point of the actuating pin.

In order to achieve this object, in preferred embodiments of the invention, the bimetallic element is clamped at one side and its free unclamped side or end sits upon the pin for actuating the clutch valve.

The one-sided firm clamping-in of the bimetallic element in the manner of a carrier clamped in on one side ensures the free mobility of the other end which acts upon the actuating pin. The fastening can take place in a sufficiently secure manner and makes a motion relative to the cover impossible. There is no danger of an undesirable detaching of the bimetallic element or of a change of position also in the case of high stress to the clutch.

In certain preferred embodiments the bimetallic element extends transversely over the cover with fastening of one end at two pins located in a radial plane. This arrangement, together with a bimetallic element which extends approximately symmetrically with respect to the clutch center, assures that unbalanced masses are avoided when the clutch is rotated. A simple mounting and a precise alignment of the bimetallic element is provided in certain embodiments where one pin is used as a plug in pin to secure the element position and the other pin is a fastening pin.

In a fluid friction clutch of the initially mentioned type having a central screw bolt which is accessible from the front side of the clutch and, as a result, permits a very simple mounting of the clutch, particularly also at the crankshaft, a radial arrangement of the bimetallic element can no longer take place. Especially preferred embodiments provide a very simple solution for this purpose utilizing a V-shaped bimetallic element which also, while largely avoiding occurring imbalances, permits the use of a bimetal element which is clamped in on one side. In especially preferred embodiments the actuating pin is located in a radial plan of the clutch, thus permitting the arranging of the actuating pin at the same point as in the radial arrangement of the bimetallic element. It is therefore not necessary to change the other clutch components, despite the construction with the central screw bolt, with respect to the actuating pin arrangement and the valve lever. In preferred embodiments there is also provided in adjusting threaded correction of the actuating pin, thus permitting a simple adjusting of the position of the valve assigned to the respective position of the bimetal element.

Other objects, advantages and novel features of the present invention will become apparent from the following detailed description of the invention when considered in conjunction with the accompanying drawings.

DETAILED DESCRIPTION OF THE DRAWINGS

Figure 1:
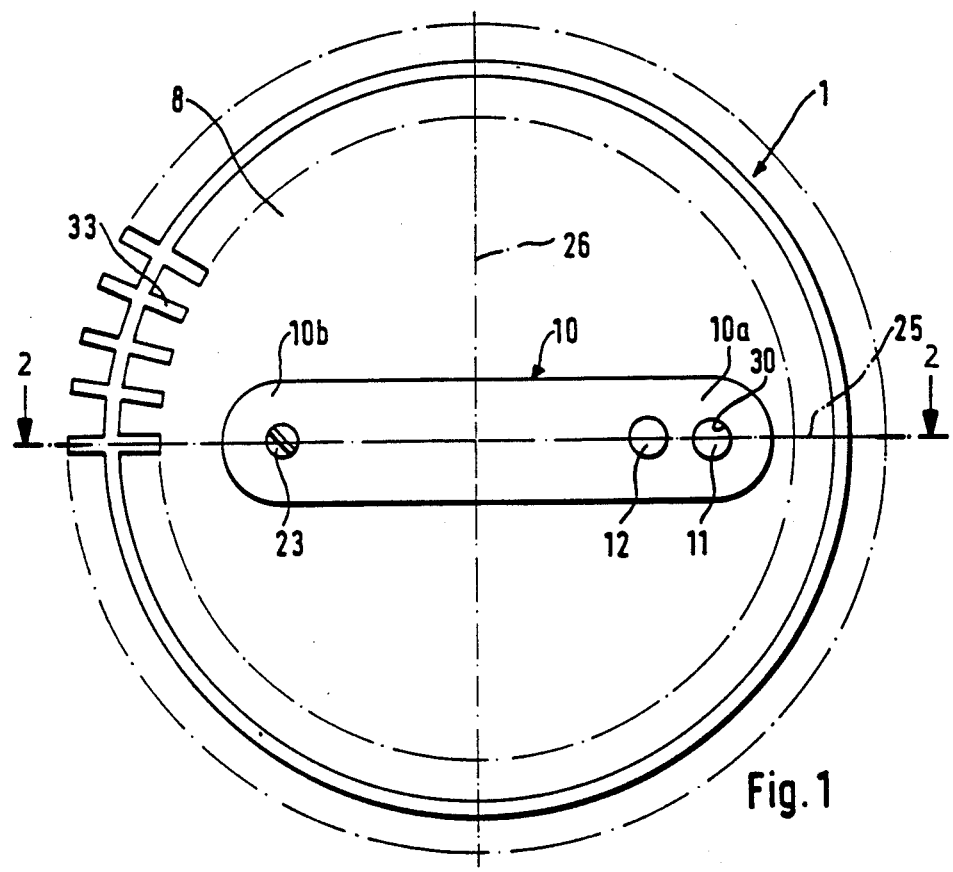
FIG. 1 is a schematic front view of a fluid friction clutch equipped according to a first preferred embodiment of the invention, having a bimetallic element extending transversely over the over.
Figure 2:
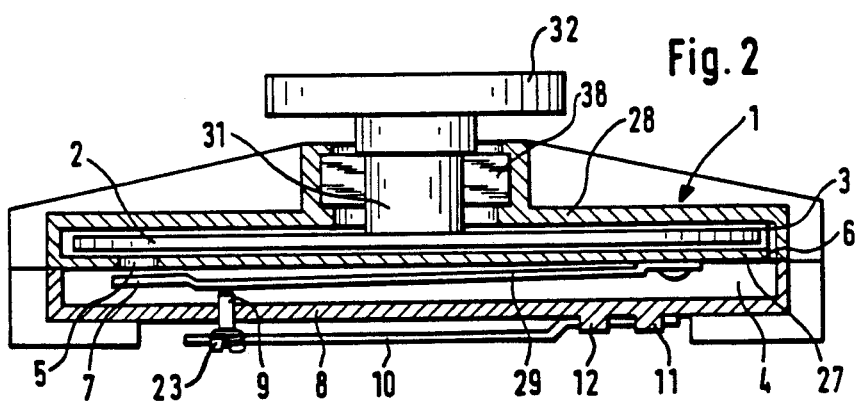
FIG. 2 is a schematic sectional view along line 2—2 of the clutch housing of FIG. 1.

In FIGS. 1 and 2, a housing 1 of a fluid friction clutch is shown, which consists of a first housing part 28 forming a working chamber 3 and of a cover 8 fitted on this first housing part 28. Working chamber 3 is formed in the housing part 28, in which chamber 3 a driven clutch disk 2 rotates. The working chamber 3 is separated by means of a partition 27 from the storage chamber 4 constructed in the cover 8. An inlet opening 5 for the clutch fluid located in the storage chamber or in the work chamber 3 is provided in the partition. In the radially outermost area, a return flow opening 6 is also provided through which the clutch fluid accumulating on the outside may be returned into the storage chamber 4 when the clutch is rotated.

At the partition 27, a lever 29 is mounted in an elastically pivotable manner which forms a valve for the closing of the inlet opening 5. For this purpose, the lever is acted upon by a pin 9 which (fluid sealed) is led tightly through the lid 8 toward the outside and there is connected with the free end 10b of a bimetallic element 10 constructed as a strip, which extends radially—along the radial plane 25—on the cover 8 and, at its end 10a, is fastened at the cover 8. This fastening takes place by means of two pins, of which one is a fastening pin 12 with which the bimetallic element 10 may be riveted on with a corresponding opening. The other pin, which is located farther toward the outside, is a plug-in pin 11 which, in a positively locking manner, engages in a corresponding opening 30 of the bimetallic element 10. The bimetallic element 10, which was placed on the cover 8 in this manner, is secured in its position in the radial plane 25. At its free end 10b, a thread may be arranged into which an adjusting screw 23 engages which, as a result of the spring effect of the bimetallic element and the valve lever 29, rests against the pin 9.

The driving disk 2 is guided in the working chamber 3 as a result of the fact that a hub 31 connected with it is sits in a bearing 38 which is arranged in the housing part 28. The hub 31 merges over into a flange 32 which may be connected with a driven part of the engine, for example, with a V-belt pulley, or directly with the crankshaft. The method of operation of the clutch corresponds to those of known fluid friction clutches. The free end 10b of the bimetallic element 10 is swivelled away from the cover 8 when the temperature rises. In the case of occurring temperature changes in the area of the fluid friction clutch which, as a rule, is arranged behind the radiator, the free end 10b thus responds to changing temperatures at the radiator. As a result, the inlet opening 5 is opened so that clutch fluid can enter into the working chamber 3 and the clutch housing is therefore taken along. The fanblades are, as a rule, mounted directly on the outside of the clutch housing. Therefore, when the temperature rise, the fan will be acted upon increasingly.

Before the start of the operation, the clutch engaging point can be established. i.e., the temperature may be determined at which the clutch is engaged. This may be achieved in a very simple manner by the adjusting of the adjusting screw 23.

Figure 4:
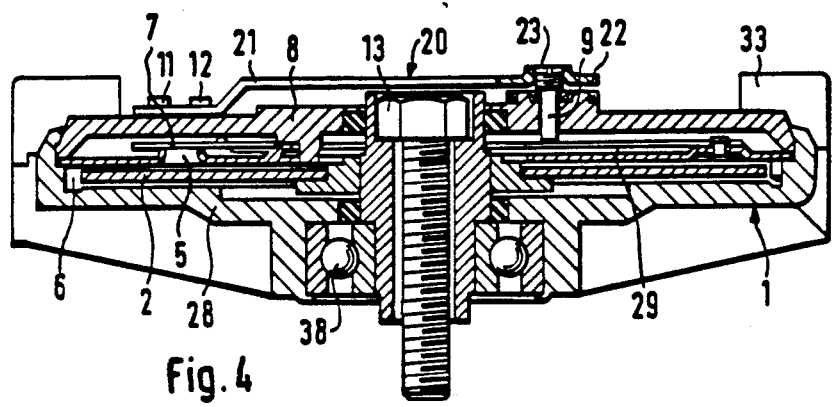
FIG. 4 is a schematic sectional view of the clutch housing of FIG. 3 along line 4—4.
Figure 3:
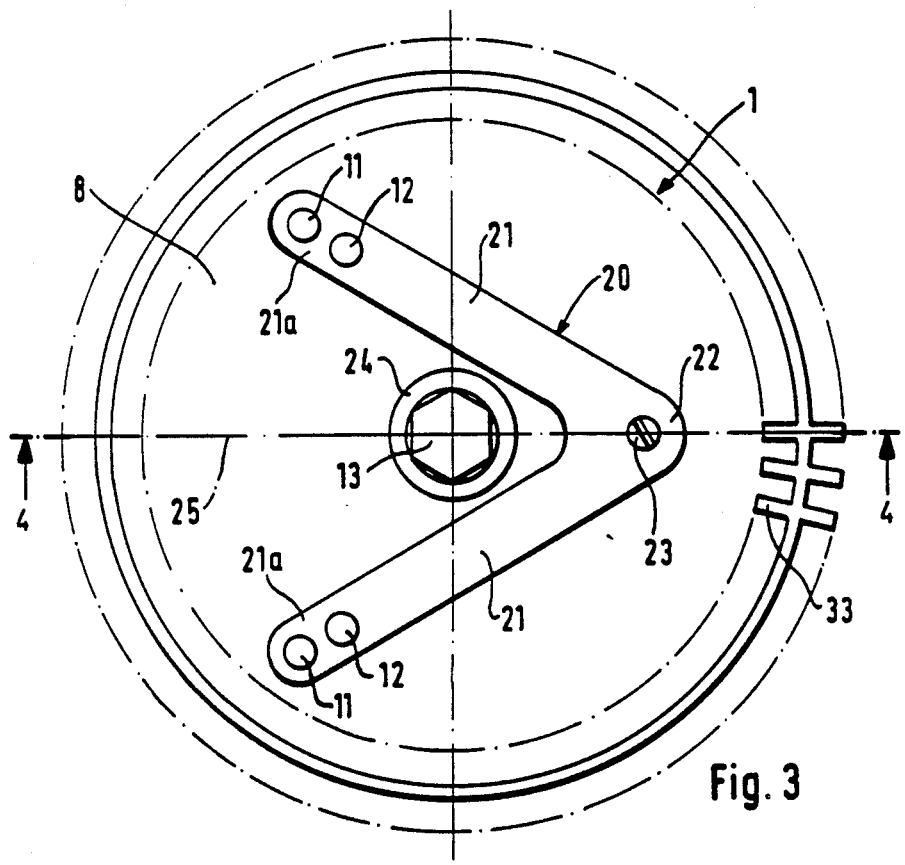
FIG. 3 is a front view of a clutch housing with a central screw bolt and with a V-shaped bimetallic element constructed in accordance with a second preferred embodiment of the invention.

FIGS. 3 and 4 show a fluid friction clutch which basically is constructed in the same manner as the one of FIGS. 1 and 2. The only difference is that, in this case, a central screw bolt 13 is provided for the fastening of the clutch or clutch housing instead of the previously mentioned flange, this screw bolt 13 being only outlined in FIG. 4. The clutch housing, by means of this screw bolt 13, may be mounted, for example, directly in a corresponding thread at a front face of an engine crankshaft.

The provided bimetallic element 20 is therefor different. It is constructed in a V-shape and, with both its legs 21, extends past the central area 24 of the clutch 1 through which the central screw bolt 13 is guided. The bimetallic element 20, at both its leg ends 21a, in the manner described by means of FIGS. 1 and 2, is arranged at the clutch cover 8 by means of a fastening pin 12 and a plug-in pin 11. At the common vertex 22 of both legs 21, an adjusting screw 23 is disposed again, in the case of the embodiment, which, in turn, rests against the actuating pin 9 which, in turn actuates the valve 7 for the closing or exposing of the inlet opening 5. Here also, the mounting of the clutch housing takes place by means of a bearing 38 at the hub 31. Identical parts of the embodiment of FIGS. 3 and 4 are therefore provided with the same reference numbers as in the case of the embodiment of FIGS. 1 and 2.

Also in the embodiment of FIGS. 3 and 4, the free side (vertex 22) of the V-shaped bimetallic element may change in its position with respect to the cover 8 in the case of temperature changes. Also in this case, the construction and the arrangement of the bimetal is such that the free end 22 moves away from the cover 8 when the temperature rise, so that the valve 7 is exposed. In the shown embodiment, the two plug-in pins 11 may also be left out because the two fastening pins 12 fix the position sufficiently.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A fluid friction clutch having a housing which has a working chamber receiving a rotatable drive disk, a storage chamber for clutch fluid, which is separated from this working chamber, and connection openings between the working chamber and the storage chamber for guiding the clutch fluid back and forth between the working chamber and the storage chamber, the inlet opening to the working chamber being openable and closable by a valve which is controlled as a function of temperature by way of an actuating pin penetrating a cover of the storage chamber, said cover being located on a side of the storage chamber facing away from the working chamber, said actuating pin acting upon said valve and being carried by a bimetallic element that is disposed transversely on the outside of the cover, wherein the bimetallic element exhibits first and second oppositely disposed end portions, wherein said bimetallic element is fixedly held with respect to said cover at only its first end portion with said second end portion being freely movable with respect to the cover, said second end portion carrying said actuating pin for movement therewith.

2. A fluid friction clutch according to claim 1, wherein the first end portion is fixedly connected to the cover by pin means.

3. A fluid friction clutch according to claim 1, further comprising pin means comprise two fixing pins located in a radial plane of the cover.

4. A fluid friction clutch according to claim 3, wherein one of the two fixing pins is constructed as a plug-in pin for securing the position of the bimetallic element at the cover and the other fixing pin is constructed as a fastening pin for fixedly fastening the bimetallic element to the cover.

5. A fluid friction clutch according to claim 4 wherein the fastening pin is disposed radially farther inside than the plug-in pin.

6. A fluid friction clutch according to claim 1, comprising a central screw bolt which is accessible from a side of the cover facing away from the working chamber for fastening of the clutch, wherein the bimetallic element is constructed in a V-shaped and is fastened at both its leg ends with both legs extending on the outside past the central clutch area receiving the screw bolt, said bimetallic element acting upon the actuating pin for the actuating of the valve at its joint vertex point.

7. A fluid fiction clutch according to claim 6, wherein the actuating pin is located in a radial plane of the clutch and disposed for movement axially of the clutch.

8. A fluid friction clutch according to claim 1, comprising an adjusting screw guided in a thread of the bimetallic element for adjusting the position of the actuating pin of the actuating valve.

* * * * *